United States Patent
Ahn et al.

(10) Patent No.: US 10,144,676 B2
(45) Date of Patent: Dec. 4, 2018

(54) AEROGEL COMPOSITE AND PREPARATION METHOD THEREOF

(71) Applicant: KOREA INSTITUTE OF ENERGY RESEARCH, Daejeon (KR)

(72) Inventors: Young-soo Ahn, Daejeon (KR); Jin-seok Lee, Sejong-si (KR); Chang Guk Hong, Gwangju (KR); Sang Eun Lee, Daegu (KR); Bong Kwan Song, Gwangju (KR)

(73) Assignee: Daehyup Tech Co., Ltd. (KR)

( * ) Notice: Subject to any disclaimer, the term of this patent is extended or adjusted under 35 U.S.C. 154(b) by 0 days.

(21) Appl. No.: 15/601,118

(22) Filed: May 22, 2017

(65) Prior Publication Data
US 2018/0105472 A1 Apr. 19, 2018

(30) Foreign Application Priority Data
Oct. 19, 2016 (KR) .................. 10-2016-0135543

(51) Int. Cl.
*C01B 33/145* (2006.01)
*C04B 38/04* (2006.01)
*C01B 33/155* (2006.01)

(52) U.S. Cl.
CPC .......... *C04B 38/04* (2013.01); *C01B 33/145* (2013.01); *C01B 33/155* (2013.01)

(58) Field of Classification Search
CPC .................................................. C01B 33/145
See application file for complete search history.

(56) References Cited

U.S. PATENT DOCUMENTS

| 2012/0025127 A1* | 2/2012 | Yeo .................. C01B 33/155 252/62 |
| 2013/0106008 A1 | 5/2013 | Ahn et al. |
| 2014/0273701 A1 | 9/2014 | Samanta et al. |
| 2016/0333572 A1 | 11/2016 | Samanta et al. |
| 2018/0010726 A1 | 1/2018 | Kim et al. |

FOREIGN PATENT DOCUMENTS

| KR | 10-2010-0133268 | 12/2010 |
| KR | 10-2012-0033159 | 4/2012 |
| KR | 10-2015-0122196 | 10/2015 |
| KR | 10-2016-0100082 | 8/2016 |

* cited by examiner

*Primary Examiner* — Andrew T Piziali
(74) *Attorney, Agent, or Firm* — Sheridan Ross P.C.

(57) ABSTRACT

The present invention relates to an aerogel composite and a preparation method thereof. The preparation method of the aerogel composite of the present invention comprises the following steps; preparing a hydrophobic gel (step 1); dispersing fiber in a solvent to prepare a solution (step 2); adding the hydrophobic gel above in the solution of step 2 and stirring the mixture to prepare a fiber and hydrophobic gel mixed solution (step 3); separating floc from the mixed solution of step 3 (step 4); and drying the floc (step 5). According to the preparation method of the aerogel composite of the present invention, a high performance aerogel composite having various shapes can be prepared.

10 Claims, 4 Drawing Sheets

AEROGEL COMPOSITE AND PREPARATION METHOD THEREOF

CROSS REFERENCE TO RELATED APPLICATIONS

This application claims the benefit of Korean Patent Application No. KR 10-2016-0135543 filed on Oct. 19, 2016, the disclosure of which is incorporated herein by reference.

BACKGROUND OF THE INVENTION

1. Field of the Invention

The present invention relates to an aerogel composite and a preparation method thereof, more precisely a high performance aerogel composite having various shapes and a preparation method of the same.

2. Description of the Related Art

Aerogel is a super-porous silica material that has a porosity of at least 90% and a pore size of 1~50 nm. In particular, the heat insulation property of aerogel is superior to any conventional insulating material, so that it is now in the spotlight as a next generation insulating material. Aerogel that is on the market as an insulating material is divided largely into two categories according to the morphology; which are aerogel monolith/powder and aerogel blanket/composite. Silica aerogel monolith has excellent properties such as super-porosity and has a very low thermal conductivity but the mechanical strength thereof is very weak, because of which it is limited in use. Particularly, aerogel powder is not easy to handle because it is very light. The aerogel powder has a very weak mechanical strength and has a hydrophobic property, which means it does not go well with water and accordingly cannot be easily mixed with other materials. Therefore, the aerogel powder is hard to be prepared as a composite and a board. Recently, studies have been going on to process aerogel as a fiber and aerogel mixed composite in order to make up the weakness of aerogel and to process aerogel in many different forms.

In the structure of the aerogel blanket or composite, fibers constitute a major matrix and aerogels are contained between them. When the aerogel blanket or composite is prepared with a low density for flexibility, it would be easily bended or folded, displaying excellent workability. Therefore, it can be applied in pipes or complicated parts for insulation. In the meantime, the aerogel blanket or composite can be processed as a high density product, and is widely used as an insulating material and an absorption material in the fields of construction, industry, and shipbuilding. In the aerogel blanket or composite, the major matrix fiber gives flexibility and mechanical strength to the composite and the aerogel staying in between fibers gives insulating property due to its own superporosity. The aerogel blanket or composite is the product prepared by combining advantageous the characteristics of fiber and aerogel and by reducing disadvantages thereof.

According to the conventional preparation method of aerogel blanket, the thickness, length, density, and shape of the woven fiber used in the blanket are limited. As an example, in the aerogel composite preparation method described in U.S. Patent Publication No. U.S. 2014/0273701, the aerogel finished with drying process is combined with non-woven fiber, so that the aerogel drying process is required twice, which might damage the insulation performance of aerogel. Moreover, in order to combine aerogel as dispersed in water with non-woven fiber, a surfactant is required to make the surface of aerogel to be absorbable, indicating that it is necessary to change the characteristics of the surface of aerogel so that the hydrophobicity of aerogel is reduced. Another problem is the difficulty of mixing because the dried aerogel powder is hard to be dispersed in a solution.

PRIOR ART REFERENCE

Patent Reference (Patent Reference 1) U.S. Patent Publication No. 2014/0273701
(Patent Reference 2) Korean Patent Publication No. 10-2010-0133268

SUMMARY OF THE INVENTION

It is an object of the present invention to provide a preparation method of an aerogel composite wherein the shape, density, and thickness of aerogel is modified to mold the composite in various shapes, and to provide an aerogel composite prepared by the preparation method above.

It is another object of the present invention to provide a preparation method of an aerogel composite which can be prepared at low cost through atmospheric pressure or vacuum drying process, and to provide an aerogel composite prepared by the preparation method above.

To achieve the above objects, the present invention provides a preparation method of an aerogel composite comprising the following steps; preparing a hydrophobic gel (step 1); dispersing fiber in a solvent to prepare a solution (step 2); adding the hydrophobic gel above in the solution of step 2 and stirring the mixture to prepare a fiber and hydrophobic gel mixed solution (step 3); separating floc from the mixed solution of step 3 (step 4); and drying the floc (step 5).

The step 1 above consists of the following sub-steps; preparing a wet-gel (step a); and making the wet-gel into a hydrophobic gel (step b).

In step 2, the solvent can be selected from the group consisting of isopropylalcohol, ethanol, methanol, butanol, acetone, n-hexane, n-heptane, xylene, cyclohexane, and a mixture thereof.

The fiber herein can be a non-woven fiber having a diameter of 1~1,000 μm and a length of 1~300 mm.

The solution of step 2 can include a dispersing agent.

In step 3, an additional step of adding a binder or a coagulant can be included.

In step 4, an additional step of eliminating a solvent from the mixed solution above by pouring the solution in a magnetic filter or mold.

The preparation method of the aerogel composite of the present invention can additionally include a step of pressing the floc separated from the mixed solution and molding thereof.

In step 5, the drying process can be performed at atmospheric pressure or under vacuum.

The present invention also provides an aerogel composite prepared by the preparation method above.

ADVANTAGEOUS EFFECT

According to the aerogel composite of the present invention and the preparation method thereof, the aerogel composite can be molded in various shapes so that it is appropriately applied to boards, sheets, and parts of equipments and devices. The shape, density, and thickness of the composite can also be adjusted according to the method above, so that it can be applied to various products.

In addition, according to the aerogel composite of the present invention and the preparation method thereof, the aerogel composite can be prepared at a low cost at a low cost by using an atmospheric pressure or a vacuum drying process while shortening the drying process.

Also, according to the aerogel composite of the present invention and the preparation method thereof, the contents of fiber and hydrophobic gel can be regulated so that a high performance aerogel composite can be prepared.

BRIEF DESCRIPTION OF THE DRAWINGS

The application of the preferred embodiments of the present invention is best understood with reference to the accompanying drawings, wherein.

DESCRIPTION OF THE PREFERRED EMBODIMENTS

Figure 1:
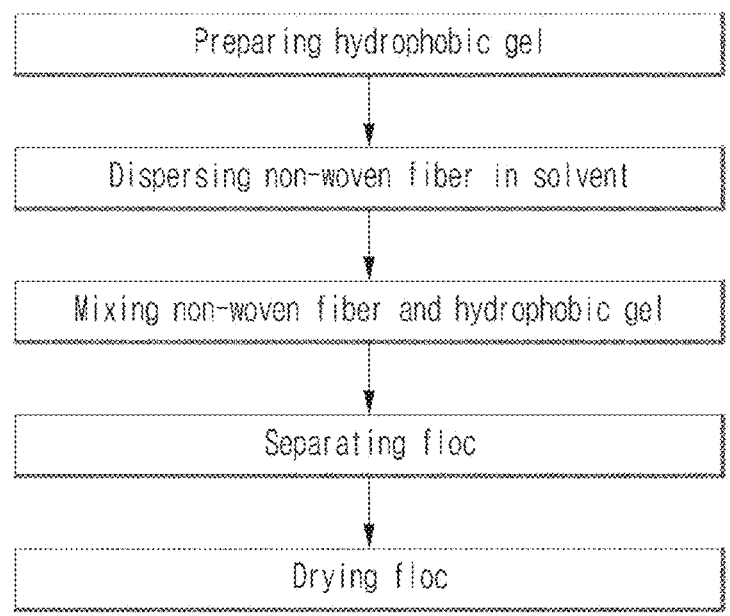
FIG. 1 is a block diagram illustrating the preparation method of an aerogel composite according to an example of the present invention.

The preferable embodiments of the present invention are described in more detail with the attached figures hereinafter. However, the examples of the invention can be modified and presented in other embodiments. Thus, the present invention cannot be limited in the following embodiments described below. The embodiments of the present invention are provided to explain the present invention more precisely to those who have the standard knowledge in this art. Therefore, the shapes and the sizes of factors in the figures can be exaggerated and the factors indicated with the same mark are the same ones in the figures. Also, the factors having a similar function and action can be indicated with a same mark over the whole figures. In this specification, the word "include" means it can additionally include other components not to exclude other components unless indicated otherwise.

The present invention provides a preparation method of an aerogel composite comprising the following steps; preparing a hydrophobic gel (step 1); dispersing fiber in a solvent to prepare a solution (step 2); adding the hydrophobic gel above in the solution of step 2 and stirring the mixture to prepare a fiber and hydrophobic gel mixed solution (step 3); separating floc from the mixed solution of step 3 (step 4); and drying the floc (step 5).

In a preferred embodiment of the present invention, the aerogel composite can be prepared in the form of a blanket, a sheet, or a board by combining non-woven fiber and aerogel.

Hereinafter, the preparation method of an aerogel composite is described in detail.

The step of preparing a hydrophobic gel (step 1) can include the following sub-steps; preparing a wet-gel (step a); and making the wet-gel into a hydrophobic gel (step b). To prepare the wet-gel, water glass is mixed with inorganic acid and alcohol or water glass is reacted with inorganic acid to form silicasol (silicic acid), and then a basic material (for example, ammonia) is added thereto. The water glass herein is an inorganic compound which is most widely used among water-soluble silicates, and includes generally the material represented by formula 1.

  [Formula 1]

(M is an alkali metal, and n is a number between 1~8.)

The water glass represented by formula 1 is a silicate alkali salt aqueous solution obtained by dissolving silicon dioxide and an alkali metal in water. The silicate alkali salt included in the water glass is exemplified by $Na_2O.SiO_2$, $K_2O.SiO_2$, and $Li_2O.SiO_2$.

The inorganic acid herein is one or more inorganic acids selected from the group consisting of nitric acid, hydrochloric acid, and sulfuric acid, but not always limited thereto. The inorganic acid can be added as a catalyst for the reaction between the water glass and alcohol in the production of the wet gel. The inorganic acid reacts with the alkali metal to form an insoluble salt to remove the alkali metal.

The alcohol herein is preferably selected from the group consisting of methanol, ethanol, isopropylalcohol, and butanol. The alcohol is preferably mixed with the water glass at the ratio of 0.33~1:1 (v/v). If the ratio of the alcohol is out of that range, the gelation does not progress or the gelation rate becomes too slow.

The wet-gel prepared by the procedure above is a hydrophilic gel having a silanol group on the surface. The wet-gel reacts with an organic solvent and an organic silane compound in step b, indicating the gel surface and the porous surface are silanised, resulting in the hydrophobicization. The organic solvent above can be isopropylalcohol, methanol, ethanol, butanol, acetone, n-hexane, n-heptane, xylene, or cyclohexane, and the organic silane compound can be trimethylchlorisilane (TMCS), hexamethyldisilazane (HMDS), methyltrimethoxysilane, trimethylethoxysilane, ethyltriethoxysilane, or phenyltriethoxysilane.

The content ratio of the organic solvent to the wet-gel is preferably 1~10:1 (v/v) and the content ratio of the organic silane compound to the wet-gel is preferably 0.1~4:1 (v/v). If the volume ratio of the non-polar organic solvent to the wet-gel is more than 10, reaction time is extended too long. In the meantime, if the volume ratio is less than 1, the porous structure of the wet-gel is shrunk and accordingly the density becomes higher or cracks are generated because of the drying shrinkage. If the volume ratio of the organic silane compound to the wet-gel is less than 0.1, reaction time is extended too long. If the volume ratio is more than 4, the porous structure of the wet-gel is shrunk due to the rapid reaction and accordingly the density becomes higher or cracks are generated because of the drying shrinkage.

In the conventional preparation method of an aerogel composite, the hydrophobic gel is dried via ambient drying or supercritical drying and the prepared aerogel particles are combined with non-woven fiber, followed by drying. Thus, the drying process is performed twice so that the three-dimensional network structure and pores of the aerogels are shrunk. Accordingly, the deterioration of the heat insulating performance of the aerogel may occur. Also, the non-woven fiber is dispersed in water and the aerogel is also dispersed in water so that they are combined together in water. Therefore, a wetting agent has to be added thereto in order to generate hydrophilicity on the outer surface layer of the aerogel particle. The addition of a wetting agent causes the decrease of hydrophobicity of the aerogel composite, so when it is used as an insulating material, it absorbs water to further decrease insulating performance and durability as an insulating material.

In the meantime, in an example of the present invention, the non-dried hydrophobic gel was combined with non-woven fiber, in order to solve the problems of the conventional aerogel composite and to maintain the unique excellent insulating performance of the aerogel, resulting in the preparation of an aerogel composite with excellent insulating property and durability. In this invention, when the hydrophobic gel was combined with non-woven fiber, the hydrophobic gel was not in the form of complete powder but in the form of colloid in a solution. Therefore, the dispersibility of the hydrophobic gel is superior to the aerogel and as a result in the aerogel composite prepared by the method of the invention, the regulation of the dispersibility is also easy, which makes the binding with fiber easy and the distribution of aerogel in fiber is satisfactory.

Step 2 is to disperse fibers in a solvent. To make the dispersion easy, a small amount of a dispersing agent or a surfactant can be added. The solvent herein can be selected from the group consisting of isopropylalcohol, methanol, ethanol, butanol, acetone, n-hexane, n-heptane, xylene, cyclohexane, and a mixture thereof. In a preferred embodiment of the present invention, the non-woven fiber indicates the short-cut chopping fiber. If the hydrophobic gel is combined with the woven fiber blanket, the thickness of the fiber matrix would be very thick and the density would be high. So, the introduction of the hydrophobic gel into the inside of the matrix is not easy and the regulation of the density of the final aerogel composite cannot be easy according to the woven fiber matrix. On the other hand, according to a preferred embodiment of the present invention, the non-woven fiber was used, by which the regulation of density was possible according to the amount of the non-woven fiber, and the introduction of the hydrophobic gel into the fiber was easy and the distribution was also satisfactory. Also, the fiber was not woven, yet, so that the shape and the size of the composite could be easily modified.

In a preferred embodiment of the present invention, the fiber can be a natural fiber or a synthetic fiber. The fiber herein can be a glass fiber that is suitable for the wet-laid process obtainable from Lauscha Fiber International; Q fiber obtainable from Johns Manville; a polymer fiber such as polyethylene fiber obtainable from Mini-Fibers; or a short-cut bicomponent fiber obtainable from Invista (before: Kosa). Other fibers usable in this invention are mineral fibers, synthetic non-carbon fibers, mineral wool, wollastonite, ceramics, cellulose, cotton, polybenzimidazole, polyaramide, acryl, phenol, polypropylene, polyolefin, or organic fibers such as aramide fibers or nylon fibers. These fibers can be coated.

In step 2, it is preferable that the fibers have a diameter of about 1 μm~1,000 μm and preferably 10 μm~100 μm, and a length of about 1 mm~300 mm and preferably 10 mm~100 mm in order to increase the degree of dispersion during the solution preparation and to increase the physical properties of the composite.

The fibers according to an embodiment of the present invention can have various shapes. For example, the fibers have a circular cross section, a triangular cross section, a pentagonal cross section, an octagonal cross section, a strip shape, a needle fir shape, a dumbbell shape, or other shape. Hollow fibers can also be used. In addition, the fibrous material can be smooth or wrinkled.

The fibers according to an embodiment of the present invention can be modified with the conventional additives, for example, antistatic agents. Also, to reduce the contribution of radiation to thermal conductivity, the solution of step 2 can include an IR opacifying agent such as carbon black, titanium dioxide, iron oxide, or zirconium dioxide, and the mixture thereof.

Step 3 is a step of adding the hydrophobic gel to a solvent in which the fibers are dispersed, and stirring a mixed solution of the fibers and the hydrophobic gel. The stirring can be performed at 100~1,000 rpm. Selectively, a binder or a coagulant can be added in order to make the mixing easy.

By the combining process in step 3, the fiber and the hydrophobic gel are combined or coagulated. To minimize the increase of the thermal conductivity due to the fiber, the content of the fiber in the solution is preferably 1~70 weight % and more preferably 2~20 weight %.

Step 4 is a step of separating the coagulated floc from the mixed solution. The mixed solution can be separated into two phases, floc and supernatant. In this description, the floc is a form in which the hydrophobic gel and the fiber are combined. In a preferred embodiment of the present invention, the floc can be separated by pouring the mixed solution on a magnetic filter or mold to eliminate the solvent. In another preferred embodiment of the invention, the floc can be separated by eliminating the solvent from the mixed solution by pouring the mixed solution in the mold, or the floc can be separated from the supernatant on the moving belt.

In the preparation method of an aerogel composite of the present invention, an additional step of molding the floc can be included wherein the floc separated from the mixed solution is pressed or compressed by a press or a roller for molding. The flock can be molded into a composite having any size and shape and having a smooth surface and a tightly coupled interior.

The drying process of step 5 can be performed via multi-step drying at atmospheric pressure or vacuum. First, the hydrophobic gel composite is naturally dried and then heat-treated at 70~200° C. for 1~3 hours under normal pressure to prepare an aerogel composite. If the temperature above is below 70° C., the solvent would not be completely evaporated, so that the aerogel composite would not be easily formed. If the temperature above is over 200° C., there would be a significant decrease in the performance of the aerogel including characteristics, specific surface area, pour size, and volume, in addition to the progress of thermal degradation of the fiber. So, the temperature above for the heat-treatment has to be carefully selected in the range above with considering the material of the used fiber.

In step 5, the solvent is evaporated from the hydrophobic gel composite under the condition of step 5, and the solid network becomes strengthened, resulting in the preparation of the final aerogel composite. According to an additional example of the present invention, this step can be performed under reduced pressure. Vacuum drying makes the pressure lower than the atmospheric pressure, so that the vaporization point (changing point of the liquid to be air) becomes lower, suggesting that the process can be achieved at a lower temperature with reduced heat energy. In particular, at the end of the drying process, a vacuum condition of the same temperature can be used to have a lesser amount of solvent (residual moisture) in the aerogel composite The aerogel composite prepared by the method of the present invention has the density of 0.1~0.20 g/cm$^3$, and the heat conductivity of 0.018~0.022 W/m. K, suggesting that the composite has a very excellent insulating property. If the aerogel composite above is placed in between layers of other materials, followed by hermetical sealing, then a panel structure would be produced. This panel structure can be used as an insulating material for the building door, floor, ceiling, and wall, or industrial or ship equipments, devices, and constructs. The frame of this structure can be composed of random, general materials such as metals, woods, and polymers.

The aerogel composite prepared according to the examples of the present invention can be used as an insulating material, an absorption material, and a fire retardant in various fields of industry such as construction, shipbuilding, aerospace, and defense, and further applied to other daily life products including winter clothes and extreme clothes.

Practical and presently preferred embodiments of the present invention are illustrative as shown in the following Examples.

However, it will be appreciated that those skilled in the art, on consideration of this disclosure, may make modifications and improvements within the spirit and scope of the present invention.

EXAMPLE 1

Step 1: Preparation of Hydrophobic Gel

The diluted water glass solution containing silica as a main ingredient was used as a raw material, which was loaded in a reactor. 1 M hydrochloric acid was added thereto at 1/3 volume ratio of water glass, followed by stirring for 6 minutes at a low speed. Ethanol was added to the generated sol at the volume ratio of 1:1, followed by stirring to synthesize a wet-gel.

Next, normal hexane and trimethylchlorosilane were added to the reactor stepwise. Once two layers were separated, the supernatant solution was separated.

Step 2: Dispersion of F in Organic Solvent 50 g of short-cut ceramics fiber was added to 500 g of isopropylalcohol solvent in a beaker, followed by stirring at 700 rpm for 30 minutes. Dispersion was induced therein by using a high power ultrasonic homogenizer for 3 minutes, resulting in a solution.

Step 3: Preparation of Fiber and Hydrophobic Gel Mixed Solution 150 g of the supernatant solution of step 1 was added to the solution prepared in step 2, followed by stirring at 700 rpm, resulting in a mixed solution.

Step 4: Separation of Floc

The mixed solution prepared in step 3 was poured in the mold prepared, to which a vacuum pump was connected to extract the solvent. The extraction of the solvent was performed for 10 minutes, leading to the separation of the floc. The solvent was extracted by using a filter paper (Advantec, Toyo Roshi Kaisha).

Step 5: Pressing and Molding the Floc

The floc separated in step 4 was placed in a mold and pressed by using a press to form a hydrophobic gel composite.

Step 6: Drying the Hydrophobic Composite

The hydrophobic gel composite was naturally dried for 12 hours, and then dried at 70° C. for 3 hours and at 150° C. for 3 hours under normal pressure to prepare an aerogel blanket

EXAMPLE 2

Reaction was induced by the same manner as described in Example 1 except that starch was added as a coagulant to the mixed solution in step 3 of Example 1.

Comparative Example 1

Step 1: Preparation of Hydrophobic Gel

The diluted water glass solution containing silica as a main ingredient was used as a raw material, which was loaded in a reactor. 1 M hydrochloric acid was added thereto at 1/3 volume ratio of water glass, followed by stirring for 6 minutes at a low speed. Ethanol was added to the generated sol at the volume ratio of 1:1, followed by stirring to synthesize a wet-gel.

Next, normal hexane and trimethylchlorosilane were added to the reactor stepwise. Once two layers were separated, the supernatant solution was separated.

Step 2: Pre-Treatment of Woven Fiber

Woven fiber was cut (width: 20 cm, length: 20 cm), followed by drying at 100° C. for 24 hours. The dried fiber matrix was loaded in a mold.

Step 3: Impregnating the Hydrophobic Gel in the Woven Fiber 150 g of the supernatant solution of step 1 was prepared. The lid was closed to seal the mold, and the reactor containing the hydrophobic was connected to a hole in the lid. Then, the hydrophobic gel was impregnated into the woven fiber using the suction force of the vacuum pump as a driving force.

Step 4: Drying Fiber Matrix

The fiber matrix impregnated with the hydrophobic gel in step 3 was taken out of the mold, which was naturally dried for 12 hours, and then dried at 70° C. for 3 hours and at 150° C. for 3 hours under normal pressure to prepare an aerogel blanket.

Experimental Example 1

The aerogel composites and the aerogel blankets prepared in Examples 1 and 2 and Comparative Example 1 were prepared as 20×20×1 cm samples. The thermal conductivity of the sample was measured at 20° C. with a HFM 436 LAMBDA NETZSCH instrument according to the method of measuring the thermal conductivity of the KS L 9016 heat insulating material. The results are shown in Table 1 below.

TABLE 1

| Example | Thermal conductivity (W/m · K) |
|---|---|
| Example 1 | 0.020 |
| Example 2 | 0.022 |
| Comparative Example 1 | 0.031 |

As shown in Table 1, the thermal conductivity of the aerogel composites prepared according to the examples of the invention was 0.02~00.022 W/m. K, suggesting that the composites have a very excellent insulating property.

Experimental Example 2

Figure 2A:
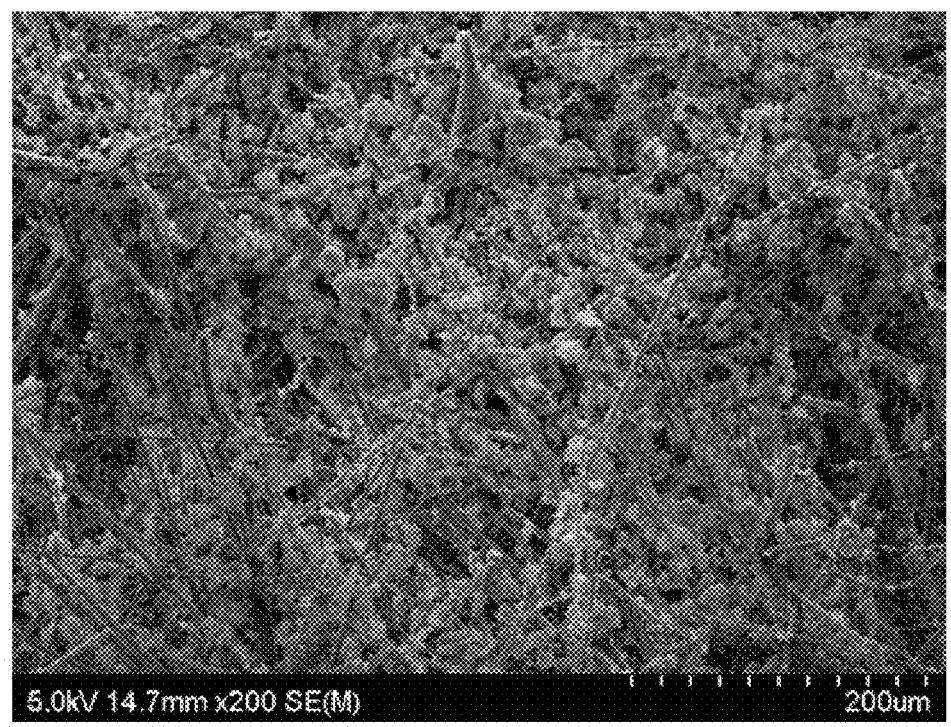
FIG. 2A is a SEM photograph showing the aerogel composite prepared according to an example of the present invention.
Figure 2B:
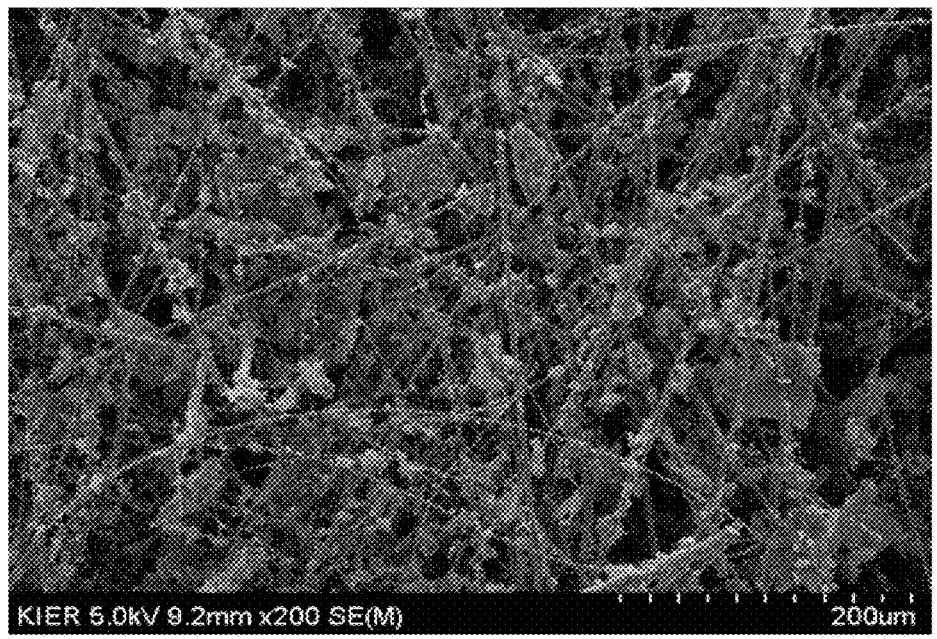
FIG. 2B is a SEM photograph showing the aerogel blanket prepared according to a comparative example of the present invention.
Figure 3:
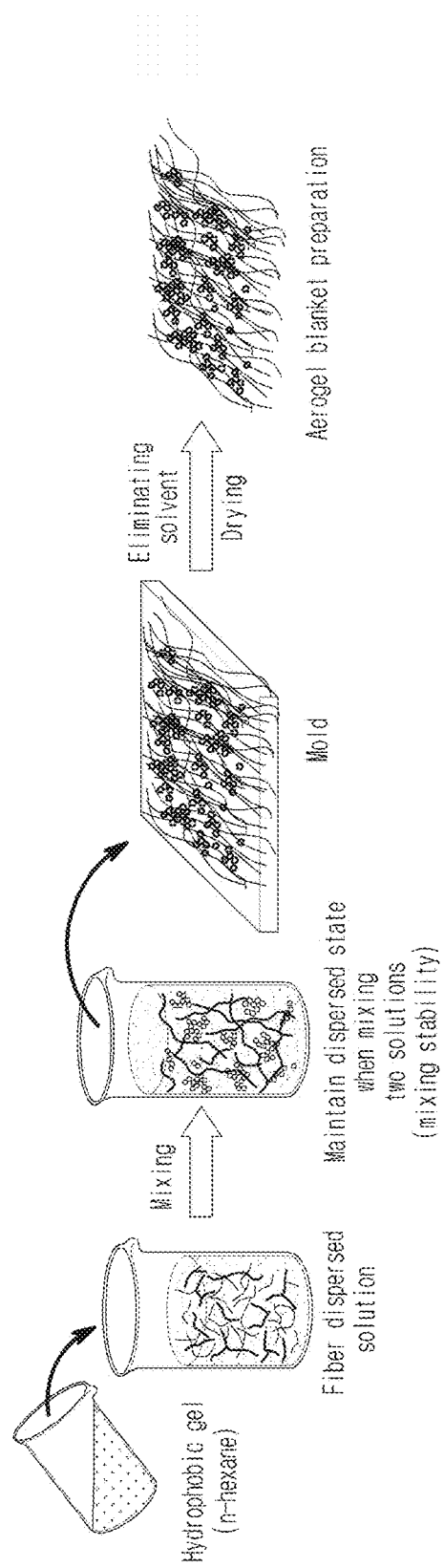
FIG. 3 is a diagram illustrating the preparation method of an aerogel composite according to an example of the present invention.

Cross-sectional SEM photographs of the aerogel composites prepared in Example 1 and Comparative Example 1 are shown in FIGS. 2 (a) and (b), respectively, Compared with the aerogel of Comparative Example 1 wherein the hydrophobic gel was impregnated in the woven fiber, the aerogel prepared in Example 1 which was prepared with the stirring of the fiber and the hydrophobic gel together displayed better dispersibility.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended Claims.

What is claimed is:

1. A preparation method of an aerogel composite comprising the following steps:
   preparing a hydrophobic gel;
   dispersing fiber in a solvent to prepare a solution;
   adding the hydrophobic gel above in the solution of dispersing step;
   stirring the mixture to prepare a fiber and hydrophobic gel mixed solution;
   separating floc from the mixed solution of the stirring; and
   drying the floc.

2. The preparation method of an aerogel composite according to claim 1, wherein the preparing step is composed of the following sub-steps:
   preparing a wet-gel; and
   making the wet-gel into a hydrophobic gel.

3. The preparation method of an aerogel composite according to claim 1, wherein the solvent of the dispersing step is selected from the group consisting of isopropylalcohol, ethanol, methanol, butanol, acetone, n-hexane, n-heptane, xylene, cyclohexane, and a mixture thereof.

4. The preparation method of an aerogel composite according to claim 1, wherein the fiber is a non-woven fiber having a diameter of 1~1,000 μm and a length of 1~300 mm.

5. The preparation method of an aerogel composite according to claim 1, wherein the adding step includes an additional step of adding a binder or a coagulant.

6. The preparation method of an aerogel composite according to claim 1, wherein the separating step includes an additional step of eliminating a solvent from the mixed solution by pouring the solution in a magnetic filter or mold.

7. The preparation method of an aerogel composite according to claim 1, wherein the method includes an additional step of pressing the floc separated from the mixed solution and molding thereof.

8. The preparation method of an aerogel composite according to claim 1, wherein the drying process in the drying step is performed under normal pressure.

9. The preparation method of an aerogel composite according to claim 1, wherein the drying process in the drying step is performed under vacuum condition.

10. The preparation method of an aerogel composite according to claim 1, wherein the solution of the dispersing step includes a dispersing agent.

* * * * *